Sept. 1, 1931. P. J. BOWMAN ET AL 1,821,174
PITMAN CONNECTION
Filed March 14, 1928
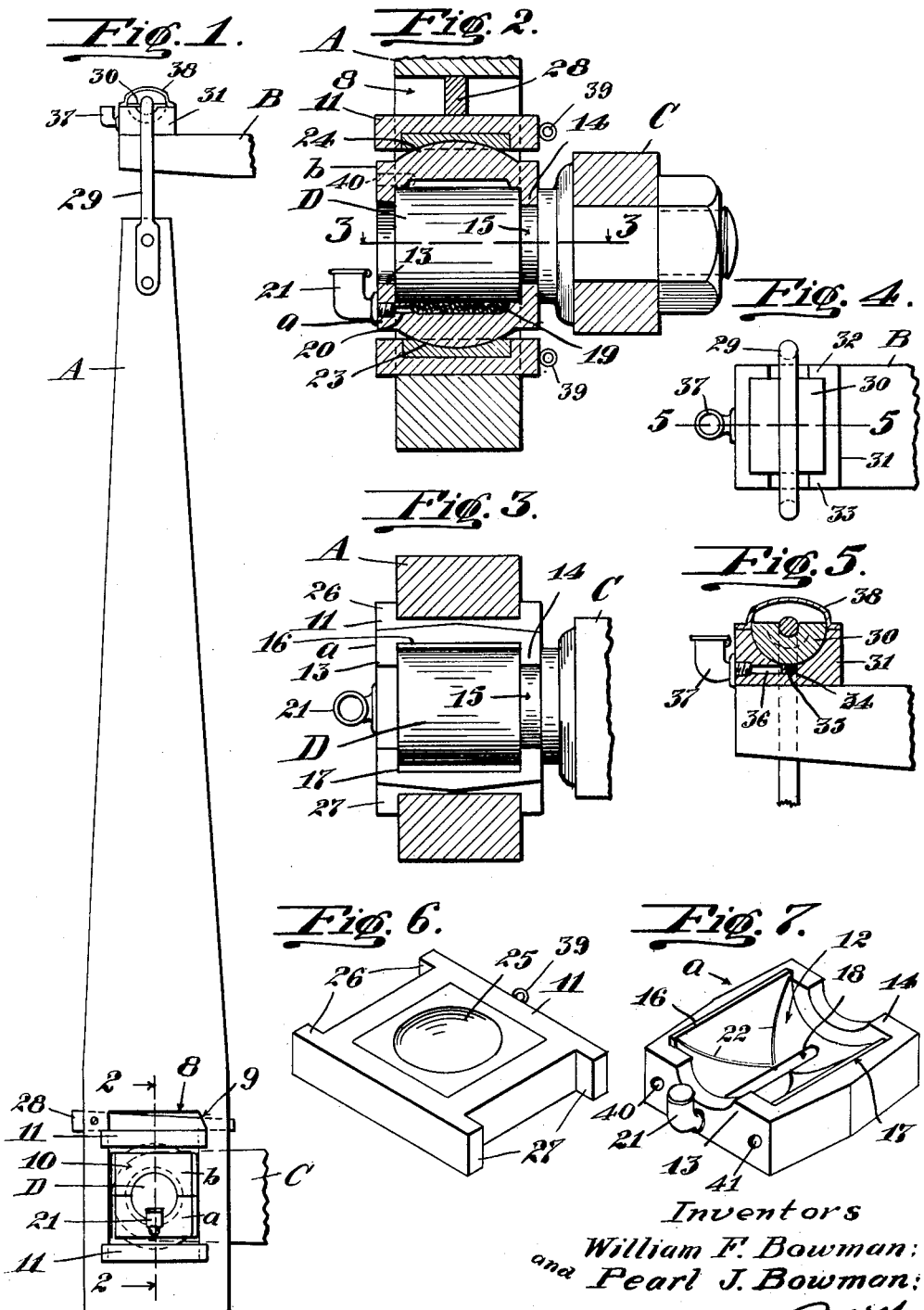
Inventors
William F. Bowman
and Pearl J. Bowman
By R. S. Berry
Attorney.

Patented Sept. 1, 1931

1,821,174

UNITED STATES PATENT OFFICE

PEARL J. BOWMAN, OF BELL, AND WILLIAM F. BOWMAN, OF OCEAN PARK, CALIFORNIA, ASSIGNORS OF ONE-THIRD TO WARREN B. EBERHART, OF BELL, CALIFORNIA

PITMAN CONNECTION

Application filed March 14, 1928. Serial No. 261,641.

This invention relates to a pitman and particularly pertains to the connections of the pitman to the driving and driven elements; the invention being especially applicable for use on the pitmen employed in pumping and drilling rigs of the type used in oil well pumping and drilling operations in which a walking beam is actuated from a crank through the instrumentality of a pitman; the subject matter to which the present invention appertains being set forth in a co-pending application for Letters Patent, Serial Number 362,508, filed May 13, 1929, by the applicants herein.

An object of the invention is to provide a construction in a pitman and its connections to the crank and walking beam, whereby the leakage or over-flow of lubricant from the bearings is obviated so as to eliminate the fire hazard incident to the accumulation and deposit of the lubricant on the rig and whereby economy of consumption of the lubricant is effected and waste thereof avoided.

Another object is to provide a construction in the pitman bearings whereby over-heating of the bearings with the resultant rapid wear and risk of fire is obviated and whereby the danger of injury to attendants when applying lubricant to the bearings is reduced to a minimum.

Another object is to provide a means for lubricating the bearing members of the pitman which will require little attention and which will enable the operator to readily determine when lubrication is required.

Another object is to provide a connection between the pitman and the crank which will compensate for inaccuracies in alignment of the pitman, wrist-pin and crank relatively to each other embodying a universal joint connection between the pitman and wrist-pin.

Another object is to provide a universal connection for pitmen and wrist-pins which is simple in construction and economical in manufacture and which may be easily and quickly assembled and disassembled.

A further object is to provide a bearing of the above character in which the bearing surfaces are so housed as to be rendered practically dirt-proof.

With the foregoing objects in view, together with such other objects and advantages as may subsequently appear, the invention resides in the parts and features, and in the combination, construction and arrangement of parts hereinafter described and claimed and illustrated by way of example in the accompanying drawings, in which:

Fig. 1 is a view in front elevation of the pitman showing it as assembled and applied;

Fig. 2 is an enlarged detail in section as seen on the line 2—2 of Fig. 1, illustrating the universal connection between the pitman and wrist-pin;

Fig. 3 is a detail in horizontal section as seen on the line 3—3 of Fig. 2;

Fig. 4 is a plan view of the connection between the upper end of the pitman and a walking beam, showing it with the cover removed;

Fig. 5 is a view in section taken on the line 5—5 of Fig. 4 with the cover applied;

Fig. 6 is a perspective view of a journal box bearing as employed in the wrist-pin connection;

Fig. 7 is a perspective view of one of a pair of journal box elements employed in the wrist-pin connection.

Referring to the drawings more specifically, A indicates the pitman which may be of any suitable material and construction, B designates a walking beam to which the upper end of the pitman is to be connected, C indicates a crank, and D a wrist-pin on the crank to which the lower end of the pitman is to be connected.

In carrying out the invention, the lower end portion of the pitman is formed with a rectangular opening 8, one side wall of which is formed adjacent the upper margin of the opening with a cut-away portion 9; the opening serving as a gudgeon to receive a journal box 10 encompassing the wrist-pin D, together with a pair of journal box bearings 11 between which the journal box 10 is interposed. The journal box 10 embodies a pair of complementary half sections $a$ and $b$, each of which embodies a box having a semi-cylindrical cavity 12 adapted to conform to substantially one-half of the circumference of the wrist-pin; the box being formed at the ends of the cavity 12 with arcuate flanges 13 and 14. The flange 13 is adapted to abut against the outer end of the wrist-pin and the flange 14 projects into a channel 15 formed on the periphery of the wrist-pin adjacent the connection of the latter to the crank C. The flanges 13 and 14 with the channel 15 serve to retain the journal box against movement longitudinally of the wrist-pin and affords a dirt-proof seal for the bearing surfaces as well as providing an enclosure for confining lubricant.

One longitudinal edge of the cavity 12 terminates in an upstanding rib 16 and the other margin of the cavity 12 terminates in a recess 17; the rib 16 on the box member $a$ extending into the channel 17 on the box member $b$, and vice-versa. Formed in the bottom wall portion of the cavity 12 is a longitudinal channel 18 in which is disposed an absorptive fibrous material 19, such as felt, constituting a lubricant distributor, and leading from the channel 18 to one end of the box member $a$ is a duct 20 with which communicates a lubricant receiving cup 21 screwed into engagement therewith. The curved wall portions of the cavities 12 are formed with lubricant distributing grooves 22. The diametrically opposite faces of the box members $a$ and $b$ are formed with protruding domes 23 and 24 which when the box members are assembled on the wrist-pin, extend an segmental portions of a common sphere.

The journal box bearings 11 are formed with sockets 25 to receive the domes 23 and 24; the sockets conforming to the domes and forming with the latter, a universal joint which will permit a slight ball and socket movement between the journal box and its bearings so as to compensate for inaccuracies of alignment of the wrist-pin or crank relatively to the pitman.

As a means for facilitating effecting connection between the pitman and the journal element, the journal box bearings 11 are formed of a length substantially corresponding to the space between the side walls of the opening 8 in the pitman, and each bearing 11 is provided with a pair of flanges 26 and 27 projecting from its opposite ends arranged to extend astride the side walls of the opening 8 in contact with the front and rear faces of the pitman, whereby the journal box bearings may be securely retained against end or side movement within the opening 8.

In assembling the journal box and its bearings, the lower bearing 11 is first put in place in the opening 8 in the pitman which is effected by inserting the bearing side-ways through the opening and bringing one end thereof into the recess 9 so that the bearing may be positioned transversely of the opening whereupon the bearing is lowered to a seated position on the lower margin of the opening. The lower journal box element $a$ is then seated on the lower bearing 11 and positioned against the under side of the wrist-pin. The upper bearing 11 is then placed in the opening 8 and seated on the upper journal box element. A key 28 is then driven into the pitman to bear on the upper bearing 11 to retain the bearings and journal box in place.

The upper end of the pitman is connected to the walking beam B by means of a strap 29 affixed to the pitman and passing over the walking beam and to which is affixed a rocker 30 seating in a bearing 31 affixed to the walking beam. The bearing 31 is formed with end flanges 32 and 33 abutting against the ends of the rocker 30 so as to confine lubricant in the bearing, and formed in the seat of the bearing 31 is a channel 34 carrying a fibrous lubricant distributor 35. Leading from the channel 34 is a duct 36 with which communicates a lubricant cup 37 screwed in engagement therewith. A cap 38 extends over the rocker 30 to prevent upward displacement of the latter.

As a means for facilitating removal and replacement of the bearings 11, the latter are provided on the rear sides thereof with eyelets 39, which are adapted to be engaged by a suitable tool whereby the inner end of the bearings may be lifted either in putting them in place or in effecting their removal; this being advantageous where the pitman and crank are disposed in such close proximity as not to permit inserting the hands therebetween, as the bearings are necessarily quite heavy, which requires their being lifted from their opposite sides and as lifting by the hands, particularly in the lower bearing 11, is sometimes precluded.

As a means for facilitating removal and replacement of the journal box members $a$ and $b$, the front ends thereof are formed with a pair of sockets 40 and 41 adapted to receive the ends of a tool by means of which the journal box member may be lifted and inserted horizontally into the opening 8; this being particularly advantageous in effecting removal of the upper journal box member $b$ as it permits lifting the journal box member to withdraw the inner end flange 14 out of engagement with the channel 15.

The operation of the invention is apparent from the foregoing; it being seen that by the provision of the dome and socket connection between the journal box members and their bearings, a universal joint will be afforded between the pitman and the wrist-pin so as to compensate for inaccuracies in their relative angular positions; the journal box being turnable universally relatively to the pitman so as to adapt it to changes in the angular axis of the pitman to the horizontal or of the pitman to the vertical. This relieves strains between the wrist-pin and the journal box ordinarily occurring where the wrist-pin and pitman are out of proper angular relation and which ordinarily results in uneven wear and over-heating of the bearing. By the provision of the recited lubricating features, waste of lubricant is prevented and proper distribution of the lubricant over the wearing surface is insured thus obviating burning out of the bearing and removing a fire hazard incident to improper lubrication and the drip and accumulations of lubricant exteriorly of the bearing.

While we have shown and described a specific embodiment of our invention, we do not limit ourselves to the exact details of construction and the arrangement shown, but may employ such changes and modifications as come within the scope of the appended claims.

Another form of our invention is set forth in a copending application Serial Number 362,508 filed May 13, 1929.

We claim:

1. The combination of a pitman, a crank, a wrist-pin on the crank formed with a peripheral channel, a pair of journal box members, each including an end flange projecting into the channel on the wrist-pin, a dome on each journal box member, a pair of bearings having sockets in which said domes seat to form a ball and socket joint, and means for affixing said bearing on said pitman.

2. The combination of a pitman, a crank, a wrist-pin on the crank formed with a peripheral channel, a pair of journal box members each including a flange on one end thereof projecting into the channel on the wrist-pin and having a flange on the other end thereof abutting against the outer end of the wrist-pin, a dome on the journal box member, a pair of bearings having sockets in which said domes seat to form a universal joint, and means for affixing said bearing on said pitman.

3. The combination of a pitman formed with an opening extending therethrough adjacent one end thereof, a crank, a wrist-pin on the crank formed with a peripheral channel, a pair of journal box members each including an end flange projecting into the channel on the wrist-pin, a pair of bearings arranged on opposite sides of the journal box members, a universal joint connection between the journal box members and bearings; said bearings being positioned in the opening in the pitman and having end flanges engaging the opposite faces of the pitman at each side of the opening.

4. The combination of a pitman formed with an opening extending therethrough adjacent one end thereof, a crank, a wrist-pin on the crank formed with a peripheral channel, a pair of journal box members each including an end flange projecting into the channel on the wrist-pin, a pair of bearings arranged on opposite sides of the journal box members, a universal joint connection between the journal box members and bearings; said bearings being positioned in the opening in the pitman and having end flanges engaging the opposite faces of the pitman at each side of the opening, and means for holding the bearings against movement relatively to the pitman.

5. The combination of a pitman formed with an opening extending therethrough adjacent one end thereof, a crank, a wrist-pin on the crank formed with a peripheral channel, a pair of journal box members each including an end flange projecting into the channel on the wrist-pin, a pair of bearings arranged on opposite sides of the journal box members, a universal joint connection between the journal box members and bearings; said bearings being positioned in the opening in the pitman and having end flanges engaging the opposite faces of the pitman at each side of the opening, and a key bearing between the pitman and the upper bearing to retain the bearings and journal box members against vertical movement in the pitman opening.

6. The combination of a pitman, a crank, a wrist-pin on the crank formed with a peripheral channel, a pair of journal box members each including a flange on one end thereof projecting into the channel on the wrist-pin and having a flange on the other end thereof abutting against the outer end of the wrist-pin, a dome on the journal box member, a pair of bearings having sockets in which said domes seat to form a universal joint; means for affixing said bearing on said pitman, and means for delivering a lubricant to the space between the end flanges of the journal box members.

7. The combination of a pitman, a crank, a wrist-pin on the crank formed with a peripheral channel, a pair of journal box members, each including an end flange projecting into the channel on the wrist-pin and at least one of said journal box members having tool engaging means for facilitating lifting of the journal box member in positioning the flange thereon on the channel on the wrist-pin and removing it therefrom, said pitman being formed with an opening adjacent one end thereof through which said journal box members extend, and means for affording a universal joint connection between said journal box members and said pitman.

In testimony whereof, we have affixed our signatures.

PEARL J. BOWMAN.
WILLIAM F. BOWMAN.